(12) United States Patent
Nakaya et al.

(10) Patent No.: US 8,830,052 B2
(45) Date of Patent: Sep. 9, 2014

(54) ALARM DISPLAY APPARATUS AND ALARM DISPLAY METHOD

(71) Applicant: Yokogawa Electric Corporation, Musashino (JP)

(72) Inventors: Makoto Nakaya, Musashino (JP); Emiko Hatsugai, Musashino (JP); Toshiaki Omata, Musashino (JP); Naoto Takano, Musashino (JP); Ayako Kouno, Musashino (JP); Yuya Iketsuki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 113 days.

(21) Appl. No.: 13/713,281

(22) Filed: Dec. 13, 2012

(65) Prior Publication Data

US 2013/0147630 A1 Jun. 13, 2013

(30) Foreign Application Priority Data

Dec. 13, 2011 (JP) .................................. 2011-272404
Oct. 2, 2012 (JP) .................................. 2012-220291

(51) Int. Cl.
*G08B 29/00* (2006.01)
*G05D 23/00* (2006.01)
*G08B 5/22* (2006.01)
*G08B 25/14* (2006.01)
*G08B 31/00* (2006.01)

(52) U.S. Cl.
CPC . *G08B 5/22* (2013.01); *G08B 25/14* (2013.01); *G05D 23/00* (2013.01); *G08B 31/00* (2013.01)
USPC .......................... 340/506; 340/691.6; 340/521

(58) Field of Classification Search
USPC ....................................... 340/691.6, 506, 521
See application file for complete search history.

(56) References Cited

U.S. PATENT DOCUMENTS

| 5,581,242 | A * | 12/1996 | Arita et al. ................. 340/691.6 |
| 6,690,274 | B1 * | 2/2004 | Bristol .......................... 340/506 |
| 7,557,702 | B2 * | 7/2009 | Eryurek et al. ............... 340/511 |
| 7,692,537 | B2 * | 4/2010 | Skold et al. ................... 340/506 |
| 2008/0088430 | A1 * | 4/2008 | Ogiyama ..................... 340/506 |
| 2010/0019894 | A1 * | 1/2010 | Okada .......................... 340/506 |

FOREIGN PATENT DOCUMENTS

| JM | 2000-181526 A | 6/2000 |
| JP | 09-026336 A | 1/1997 |
| JP | 09-190216 A | 7/1997 |
| JP | 10-307619 A | 11/1998 |
| JP | 2004-240642 A | 8/2004 |
| JP | 2005332360 A | 12/2005 |

OTHER PUBLICATIONS

Nakaya, Makoto, et al., "Utilization of Tracking Simulator and its application to the future plant operation", Yokogawa Technical Report, Field-ubiquitous Computing, Yokogawa Electric Corporation, 2008, vol. 52, No. 4, pp. 31-34.

* cited by examiner

*Primary Examiner* — Eric M Blount
(74) *Attorney, Agent, or Firm* — Sughrue Mion, PLLC

(57) ABSTRACT

An alarm display apparatus includes an acquisition module, a plant simulation module, a prediction module, an actual measurement alarm determination module, an estimation alarm determination module, a prediction alarm determination module and a display module. The display module displays, on the same screen, an actual measurement alarm information outputted from the actual measurement alarm determination module, an estimation alarm information outputted from the estimation alarm determination module and an prediction alarm information outputted from the prediction alarm determination module.

15 Claims, 12 Drawing Sheets

FIG. 4

ALARM DISPLAY

| DEGREE OF IMPORTANCE | TIME | TAG NAME | STATUS |
|---|---|---|---|
| ☐ (120 MINUTES) | (2011/10/13 10:44:01) | (TI0006) | (LO) |
| ☐ 105 MINUTES | 2011/10/13 10:42:33 | FI0002 | HI |
| ☐ 60 MINUTES | (2011/10/13 10:41:29) | PI0003 | LO |
| ☐ (50 MINUTES) | 2011/10/13 10:40:08 | (TC0001) | (HH) |
| ☐ 20 MINUTES | 2011/10/13 10:40:01 | LC0004 | LL |
| ☐ (15 MINUTES) | (2011/10/13 10:38:44) | (FC0005) | (HI) |
| ☐ | | (TC0003) | (LO) |
| ☐ | | FI0005 | HI |
| ☐ | | (PI0002) | (HH) |
| ☐ | | LC0004 | LL |
| ☐ | | FC0002 | HI |
| ☐ | | (TI0006) | (LO) |

| | ALARM DISPLAY | | | ⊠ |
|---|---|---|---|---|
| | ALARM TIME | TAG NAME | STATUS | |
| 303 → | (2011/10/13 13:01:44) | (TID006) | (LO) | |
| | 2011/10/13 10:54:32 | FID002 | HI | |
| | 2011/10/13 10:53:22 | FID003 | LO | |
| | (2011/10/13 10:49:11) | (TC0001) | (HH) | |
| 301 → | 2011/10/13 10:47:50 | LCD004 | LL | ← 308b |
| | (2011/10/13 10:46:35) | (FCD005) | (HI) | ← 308a |
| 302 → | (2011/10/13 10:43:01) | (TC0003) | (LO) | |
| | 2011/10/13 10:42:38 | FID005 | HI | |
| | (2011/10/13 10:41:15) | (PI0002) | (HH) | |
| | 2011/10/13 10:40:53 | LC0004 | LL | |
| | 2011/10/13 10:40:31 | FID001 | HI | |
| | (2011/10/13 10:37:11) | (TI0006) | (LO) | |

304 ↑   305 ↑   306 ↑   307 ↑

ALARM DISPLAY APPARATUS AND ALARM DISPLAY METHOD

CROSS-REFERENCE TO RELATED APPLICATION(S)

The present application claims the benefit of priorities of Japanese Patent Application No. 2011-272404, filed on Dec. 13, 2011 and Japanese Patent Application No. 2012-220291, filed on Oct. 2, 2012. The disclosures of these applications are incorporated herein by reference.

BACKGROUND

1. Technical Field

The present invention relates to an alarm display apparatus and an alarm display method which display alarm information indicating the generation state of alarms based on information obtained from a plant.

2. Related Art

There has been used a system which is configured to, for example, in order to support the operation of a plant, determine whether or not abnormality occurred based on measured data of devices installed in the plant and measured data within a field control system and generate an alarm when it is determined that abnormality occurred in the measured data.

When alarms having been generated until present time are juxtaposed in the order of generation times on an alarm display screen for notifying the generation of alarms, an operator can grasp the generation state of the alarms.

PRIOR ART DOCUMENTS

Patent Literature

[Patent Literature 1] JP-A-2005-332360

Non-Patent Literature

[Non-Patent Literature 1] Makoto Nakaya and two others, "Utilization of Tracking Simulator and Future Application to Plant Operation", Yokogawa Technical Report, Yokogawa Electric Corp., 2008, Vol. 52, No. 4, pp 31-34

However, the measured data of the devices installed in a plant and the measured data within the field control system contains data measured with a time interval of one second, for example, temperature or pressure and data requiring a measuring interval of several over ten minutes, for example, the measurement using a gas chromatograph. Further, abnormality can not be detected in real time as to a portion where a sensor cannot be actually installed or a portion where measurement is performed with a long interval. Furthermore, if an alarm probably generated in the future can be known in advance, an operator can execute an operation necessary for the plant operation at a required timing.

SUMMARY

One or more exemplary embodiments of the present invention provide an alarm display apparatus and an alarm display method which can properly display an alarm information necessary for the operation of the plant.

An alarm display apparatus, according to an exemplary embodiment of the invention, for displaying alarm information indicating a generation state of alarms based on information acquired from a plant, comprises:

an acquisition module configured to acquire actual measurement values of data obtained from the plant;

a plant simulation module configured to simulate a current state of the plant based on the data obtained from the plant to thereby output current estimation values of data of the plant;

a prediction module configured to predict a future state of the plant based on the estimation values outputted from the plant simulation module;

an actual measurement alarm determination module configured to compare the actual measurement values acquired by the acquisition module with a threshold value to thereby output actual measurement alarm information based on a result of the comparison between the actual measurement values and the threshold value;

an estimation alarm determination module configured to compare the estimation values outputted from the plant simulation module with a threshold value to thereby output estimation alarm information based on a result of the comparison between the estimation values and the threshold value;

a prediction alarm determination module configured to compare the prediction values outputted from the prediction module with a threshold value to thereby output prediction alarm information based on a result of the comparison between the prediction values and the threshold value; and a display module configured to display, on the same screen, the actual measurement alarm information outputted from the actual measurement alarm determination module, the estimation alarm information outputted from the estimation alarm determination module and the prediction alarm information outputted from the prediction alarm determination module.

The display module may display the actual measurement alarm information, the estimation alarm information and the prediction alarm information in a manner that they are juxtaposed on the screen in a chorological order accorded to generation times of the respective alarms.

The display module may display the actual measurement alarm information, the estimation alarm information and the prediction alarm information in a manner that background colors of each of the respective information differ between the alarms generated in past and the alarms to be generated in future.

The display module may display the actual measurement alarm information, the estimation alarm information or the prediction alarm information in a scrollable manner that a time zone of generation times of the alarms is selectable.

The display module may display each of the alarms represented by the prediction alarm information in a manner that a time period, from a current time to a time where the alarm is predicted to be generated, is displayed as a graphical display.

The display module may display the graphical display with a color according to a degree of importance of the alarm.

The display module may display the prediction alarm information in a mode capable of discriminating whether or not the prediction alarm information relates to data kind to be subjected as the actual measurement alarm information.

The display module may display, as trends, the actual measurement values acquired by the acquisition module, the estimation values outputted from the plant simulation module or the prediction values outputted from the prediction module.

The display module may display, as trends, the actual measurement values acquired by the acquisition module, the estimation values outputted from the plant simulation module or the prediction values outputted from the prediction module in a mode that background colors of the respective trends differ between the trends in past and the trends in future.

The background color at a time of displaying the actual measurement alarm information, the estimation alarm information and the prediction alarm information in the past may be same as the background color at a time of displaying the trends in the past, and the background color at a time of displaying the actual measurement alarm information, the estimation alarm information and the prediction alarm information in the future may be same as the background color at a time of displaying the trends in the future.

The display module may display, at a time of displaying the trends, an area representing a determination result of the actual measurement alarm determination module, the estimation alarm determination module or the prediction alarm determination module.

A combination of display colors of a plurality of elements in the trend display may be registered in advance, and the display module may display the trends in accordance with the combination thus registered.

The alarm display apparatus may further comprise:

a receiving module configured to receive setting of display colors used for the trend display, wherein the display module displays a color sample screen for showing the display colors received by the receiving module prior to the trend display.

When a cursor is moved to the trend of the trend display, the display module may display a kind of the trend to which the cursor is moved.

The display colors in the trend display may be set with reference to display colors used in another apparatus different from the alarm display apparatus.

An alarm display method, according to an exemplary embodiment of the invention, for displaying alarm information indicating a generation state of alarms based on information acquired from a plant, comprise:

acquiring actual measurement values of data obtained from the plant;

simulating a current state of the plant based on the data obtained from the plant to thereby output current estimation values of data of the plant;

predicting a future state of the plant based on the estimation values;

comparing the actual measurement values with a threshold value to thereby output actual measurement alarm information based on a result of the comparison between the actual measurement values and the threshold value;

comparing the estimation values with a threshold value to thereby output estimation alarm information based on a result of the comparison between the estimation values and the threshold value;

comparing the prediction values with a threshold value to thereby output prediction alarm information based on a result of the comparison between the prediction values and the threshold value; and displaying, on a same screen, the actual measurement alarm information, the estimation alarm information and the prediction alarm information.

According to the exemplary embodiments of the present invention, it is possible to provide an alarm display apparatus and an alarm display method which can properly display an alarm information necessary for the operation of the plant.

According to the alarm display apparatus of the present invention, by displaying, on a same screen, the actual measurement alarm information, the estimation alarm information and the prediction alarm information, the alarm information necessary for the operation of the plant can be properly displayed.

According to the alarm display method of the present invention, by displaying, on a same screen, the actual measurement alarm information, the estimation alarm information and the prediction alarm information, the alarm information necessary for the operation of the plant can be properly displayed.

BRIEF DESCRIPTION OF THE DRAWINGS

FIG. 4 shows an example of a screen in a case of scrolling on the alarm screen.

FIG. 10 is a diagram showing an example of an alarm screen.

DETAILED DESCRIPTION

Hereinafter, embodiments of an alarm display apparatus according to this invention will be explained.

First Embodiment

Figure 1:
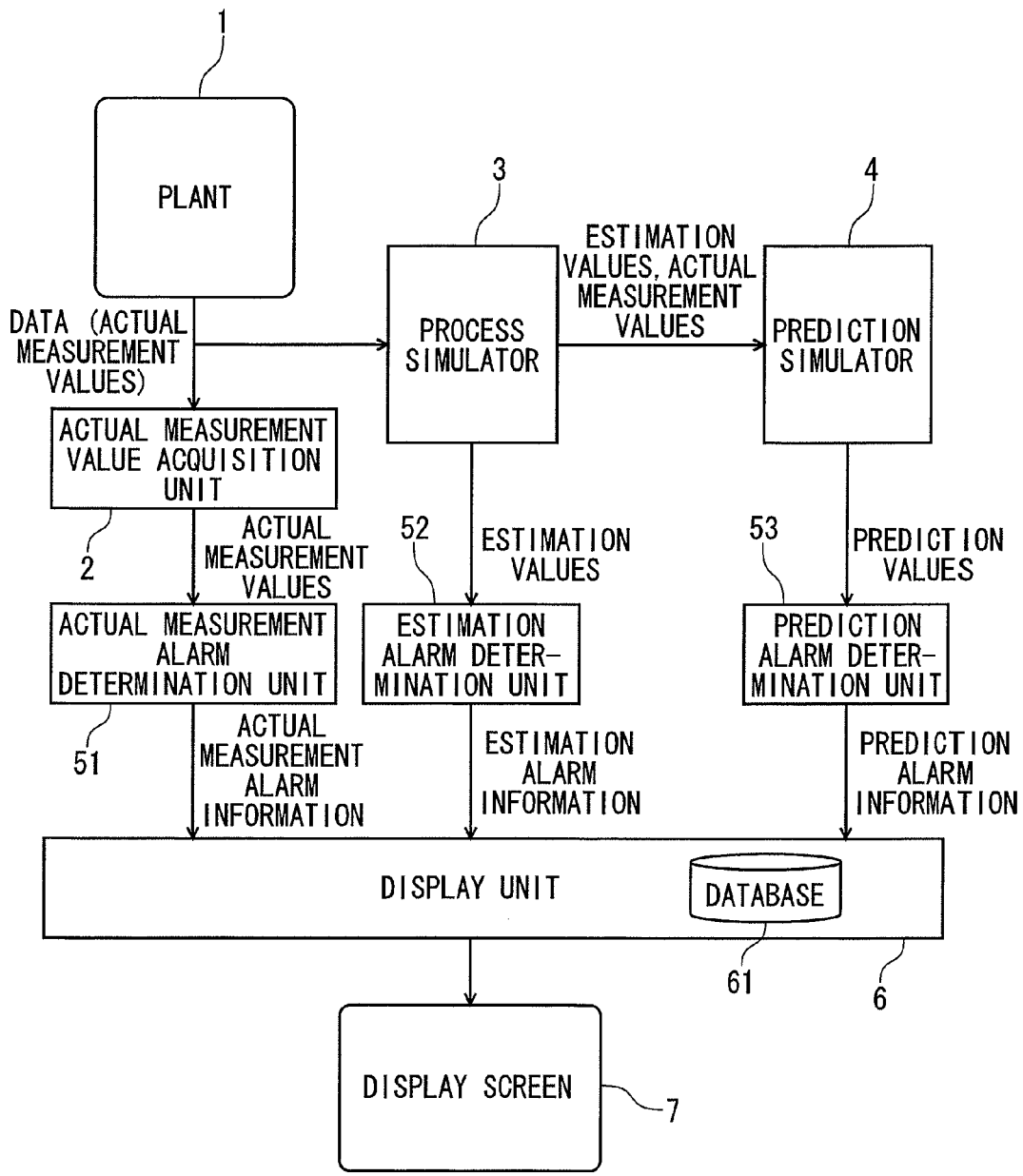
FIG. 1 is a block diagram showing a configuration of an alarm display apparatus according to an embodiment.

FIG. 1 is a block diagram showing the configuration of the alarm display apparatus according to an embodiment (first embodiment).

As shown in FIG. 1, the alarm display apparatus according to this embodiment includes an actual measurement value acquisition unit 2 which acquires actual measurement values of various kinds of data such as pressure, temperature and flow rate from the plant 1; the process simulator 3 which simulates the process of the plant 1 based on data acquired from the plant 1 and outputs estimation values of data of the plant 1; a prediction simulator 4 which predicts the operation state of the plant 1 in the future based on calculation results of the process simulator 3 and outputs prediction values of process data in the future of the plant 1; an actual measurement alarm determination unit 51 which performs determination based on the actual measurement values acquired via the actual measurement value acquisition unit 2 and outputs actual measurement alarm information; an estimation alarm determination unit 52 which performs determination based on the estimation values acquired from the process simulator 3 and outputs estimation alarm information; a prediction alarm determination unit 53 which performs determination based on the prediction values acquired from the prediction simulator 4 and outputs prediction alarm information; and a display unit 6 which displays on a display screen 7 the actual measurement alarm information outputted from the actual measurement alarm determination unit 51, the estimation alarm information outputted from the estimation alarm determination unit 52 and the prediction alarm information outputted from the prediction alarm determination unit 53.

The plant 1 is controlled by the field control system. The process simulator 3 is applied with control values etc. in the field control system in addition to measurement values of process data measured in the plant 1 or acquired in the field control system.

The process simulator 3 executes in real time simulation based on models accorded to the physical or chemical law. The process simulator 3 sequentially acquires the values of the process data and other data and inputs them into the model to thereby instantaneously calculate numerical values, including physical quantities at a portion where a sensor can not be inserted and composition values or material values (viscosity of material, for example) requiring sufficient time for the measurement, and outputs the calculation result as the estimation values.

The process simulator 3 compares the estimation values with the actual measurement values acquired from the plant 1 to thereby correct periodically, for example, the model for calculating the estimation values or the inner parameter of a calculation expression using the model. As a result, since the model or the calculation expression representing the plant 1 can dynamically trace the actual behavior of the plant 1, the propriety of the simulation can be maintained always.

The prediction simulator 4 inputs the estimation values acquired from the process simulator 3 and the actual measurement value of the process data acquired from the plant 1 to the model for simulating the operation of the plant 1 as initial values of the process data to thereby predict values of the process data in the future. The prediction simulator 4 executes the simulation of the state of the plan 1 at the calculation speed faster than the real time to thereby output the values of the process data representing the operation state of the plant 1 in the future as the prediction values.

The prediction simulator 4 is also applied with a control state in the field control system for controlling the plant 1 and the prediction simulator 4 executes future prediction in the case where a manual operation via the field control system is not performed. In other words, values of the process data in the future in the case where the control state of the current automatic control continues are outputted from the prediction simulator 4 as the prediction values.

The prediction time (prediction interval) at which the prediction is performed by the prediction simulator 4 can be set via an input interface (not shown), for example. The prediction simulator 4 sequentially repeats the prediction according to the prediction time thus set. The prediction values outputted from the prediction simulator 4 contain the prediction values of the data acquired as the actual measurement values from the plant 1 and the prediction values of the data acquired as the estimation values from the process simulator 3.

Figure 2:
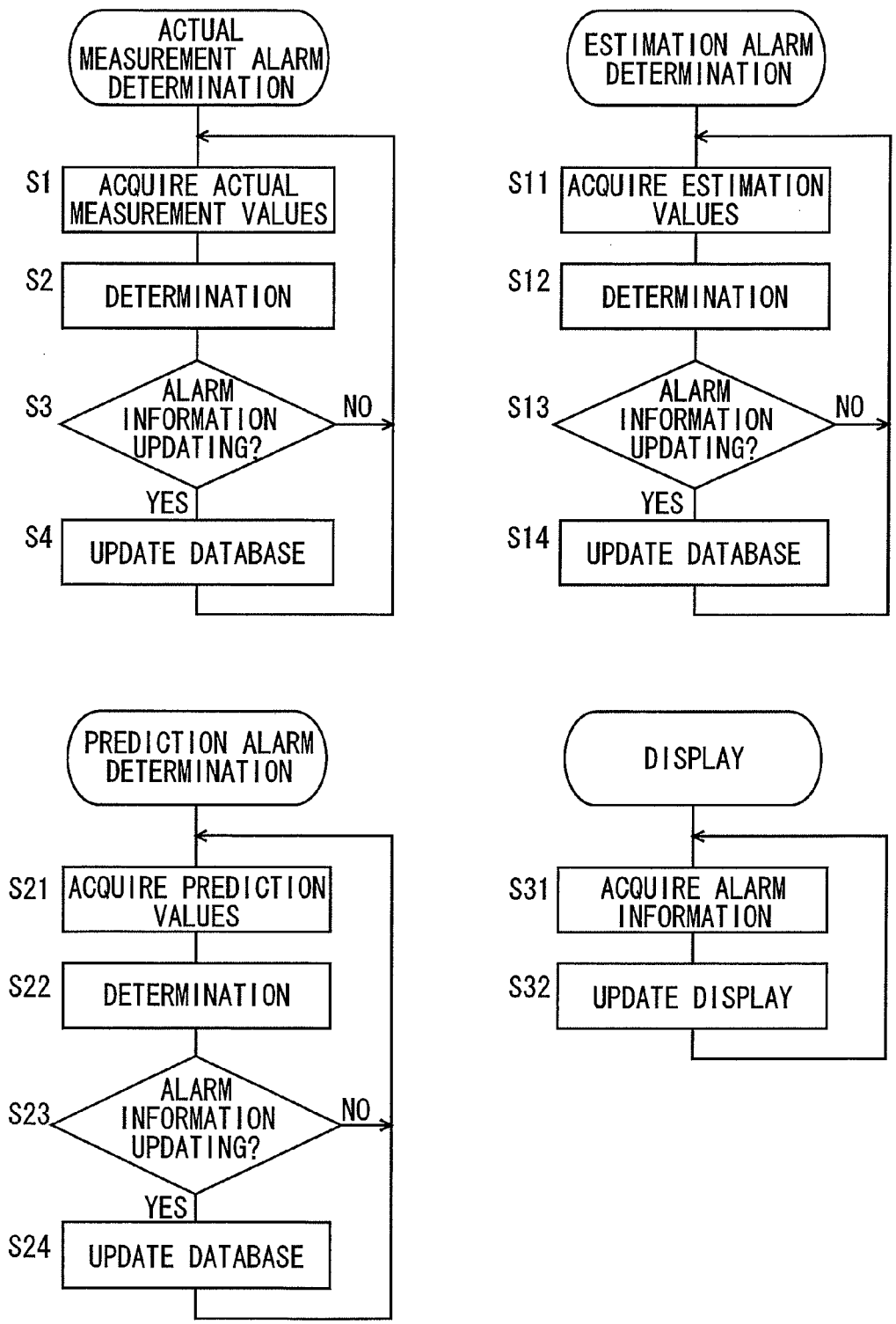
FIG. 2 is flowcharts showing operations of an actual measurement alarm determination unit, an estimation alarm determination unit, a prediction alarm determination unit and a display unit.

FIG. 2 is flowcharts showing the operations of the actual measurement alarm determination unit 51, the estimation alarm determination unit 52, the prediction alarm determination unit 53 and the display unit 6.

Steps S1 to S4 of FIG. 2 show the operation of the actual measurement alarm determination unit 51.

In step S1 of FIG. 2, the actual measurement alarm determination unit 51 acquires the actual measurement values of various kinds of data containing the process data measured in the plant 1 via the actual measurement value acquisition unit 2 and the data acquired from the field control system. Then, in step S2, the comparison is made between each of the actual measurement values acquired in step S1 and an alarm setting value (upper limit value, lower limit value, for example) determined at each of the actual measurement values in advance to thereby update the alarm information, if necessary. For example, when the actual measurement value is bigger than the upper limit value or lower than the lower limit value, an actual measurement alarm is generated. When the data for which the actual measurement alarm having been generated shifts between the upper limit value and the lower limit value, the actual measurement alarm that has been generated may be cancelled.

Then, in step S3, it is determined whether or not the alarm information is updated in step S2. When the determination is confirmative, the process proceeds to step S4, whilst when the determination is negative, the process returns to step S1.

In step S4, the actual measurement alarm information reflecting the updating in step S2 is written into the database 61 of the display unit 6 shown in FIG. 1, and the process returns to step S1.

Steps S11 to S14 of FIG. 2 show the operation of the estimation alarm determination unit 52.

In step S11 of FIG. 2, the estimation alarm determination unit 52 acquires the estimation values from the process simulator 3. Then, in step S12, the comparison is made between each of the estimation values acquired in step S11 and an alarm setting value (upper limit value, lower limit value, for example) determined at each of the estimation values in advance to thereby update the alarm information, if necessary. For example, when the estimation value is bigger than the upper limit value or lower than the lower limit value, an estimation alarm is generated. When the data for which the estimation alarm having been generated shifts between the upper limit value and the lower limit value, the estimation alarm that has been generated may be cancelled.

Then, in step S13, it is determined whether or not the alarm information is updated in step S12. When the determination is confirmative, the process proceeds to step S14, whilst when the determination is negative, the process returns to step S11.

In step S14, the estimation alarm information reflecting the updating in step S12 is written into the database 61 of the display unit 6 shown in FIG. 1, and the process returns to step S11.

Steps S21 to S24 of FIG. 2 show the operation of the prediction alarm determination unit 53.

In step S21 of FIG. 2, the prediction alarm determination unit 53 acquires the prediction values from the prediction simulator 4. Then, in step S22, the comparison is made between each of the prediction values acquired in step S21 and an alarm setting value (upper limit value, lower limit value, for example) determined at each of the prediction values in advance to thereby update the alarm information, if necessary. For example, when the prediction value is bigger than the upper limit value or lower than the lower limit value, a prediction alarm is generated. When the data for which the prediction alarm having been generated shifts between the upper limit value and the lower limit value, the prediction alarm that has been generated may be cancelled.

Then, in step S23, it is determined whether or not the alarm information is updated in step S22. When the determination is confirmative, the process proceeds to step S24, whilst when the determination is negative, the process returns to step S21.

In step S24, the prediction alarm information reflecting the updating in step S22 is written into the database 61 of the display unit 6 shown in FIG. 1, and the process returns to step S21.

Steps S31 to S32 of FIG. 2 show the operation of the display unit 6.

In step S31 of FIG. 2, the display unit 6 accesses the database 61 and reads newest data of the actual measurement alarm information, the estimation alarm information and the prediction alarm information.

Then, in step S32, the display unit 6 displays, on the display screen 7, an alarm screen indicating the actual measurement alarm information, the estimation alarm information and the prediction alarm information each read most recently, and the process returns to step S31.

Figure 3:
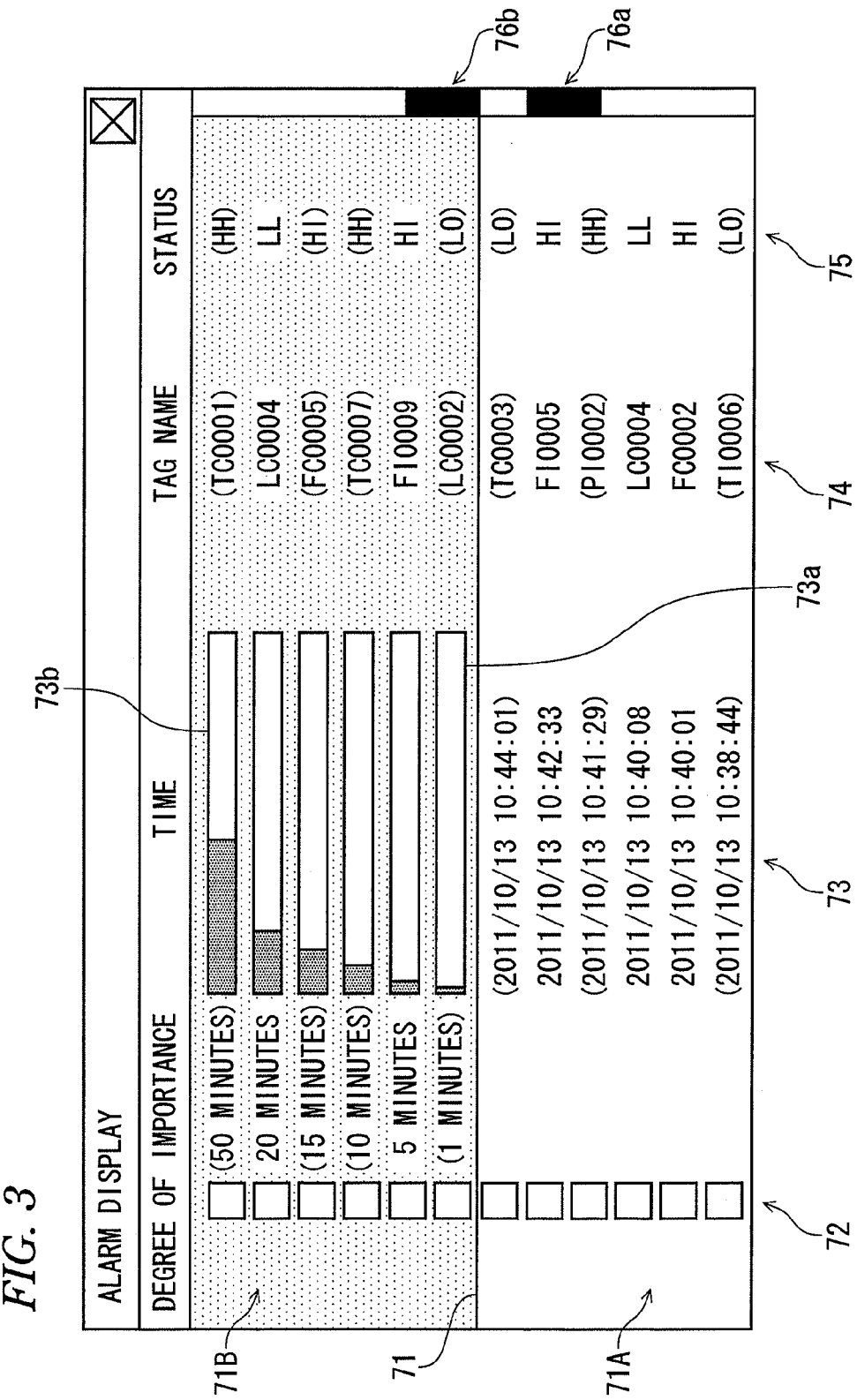
FIG. 3 is a diagram showing an example of an alarm screen.

FIG. 3 is a diagram showing an example of the alarm screen displayed on the display screen 7.

As shown in FIG. 3, the display screen 7 displays the alarms in a chronological order along the vertical direction as a time axis. In the example of FIG. 3, an area 71A for displaying the alarms having been generated in the past, that is, the actual measurement alarms and the estimation alarms, is provided below a bar 71 representing the current time. Further, an area 71B for displaying the alarms predicted to be generated in the future, that is, the prediction alarms, is provided above the bar 71. The alarms displayed in the area 71A are disposed in a chronological order and also the alarms displayed in the area 71B are disposed in a chronological order. In each of these areas, the alarms are disposed in the reverse chronological order from the lower position toward the upper position in a manner that the alarm having the older generation time or the older prediction time is disposed at the lower position.

As shown in FIG. 3, the area 71A and the area 71B have different background colors, respectively. Thus, it can be easily grasped as to whether the generation time of each of the alarms belongs to the past or the future. Since the alarms now being generated are displayed in the area 71A and the alarms expected to be generated in the future are displayed in the area 71B, the current states of the respective alarms can be grasped at a glance.

The attribute and the generation time etc. of each of the alarms are shown in a field 72 for displaying the degree of importance of the each alarm, a field 73 for displaying the generation time or the generation prediction time of the each alarm, a field 74 for displaying a tag name as the generation source of the each alarm and a field 75 for displaying the status of the each alarm. As shown in FIG. 3, the display modes of the generation times and the generation prediction times in the field 73 differ between the area 71A and the area 71B in a manner that the generation time of each of the alarms is displayed as a character sequence in the area 71A and the generation prediction time of each of the alarms is graphically displayed as a bar. The length of each of these bars corresponds to a time period from the current time to the alarm generation prediction time. For example, a bar 73a represents that this time is 1 minute together with a character sequence ("1 minute"), and a bar 73b represents that this time is 50 minutes together with a character sequence ("50 minute"). The length of the bar becomes shorter with time and the corresponding alarm is generated when the length of the bar becomes 0. When the alarm is generated actually, the display of this alarm shifts to the area 71A.

The time represented by the maximum length of the bar (120 minutes in FIG. 3) may be configured to be changed according to the prediction time (prediction interval) etc. set in the prediction simulator 4.

Further, FIG. 3 shows, as an example, a case that a part of the actual measurement alarms and the estimation alarms stored in the database 61 are displayed in the area 71A, and a part of the prediction alarms stored in the database 61 are displayed in the area 71B. The actual measurement alarms and the estimation alarms to be displayed in the area 71A can be selected by operating a button 76a, and the prediction alarms to be displayed in the area 71B can be selected by operating a button 76b. The position of the button 76a along the vertical direction corresponds to a time zone of the generation times of the alarms to be displayed, and the position of the button 76b along the vertical direction corresponds to a time zone of the generation prediction times of the alarms to be displayed. When each of the button 76a and the button 76b is moved in the vertical direction, the alarms to be displayed are scrolled in corresponding to the button thus moved.

FIG. 4 shows an example of the screen in the case of operating the button 76b. In the state shown in FIG. 3, when the button 76b is slid downward, the alarms to be displayed are sequentially shifted to ones having earlier generation prediction times. In contrast, when the button 76b is slid upward, the alarms to be displayed are sequentially shifted to ones having later generation prediction times. For example, the alarms predicted to be generated in a time zone (1 minute later to 50 minutes later) closer to the current time are displayed in the area 71B in FIG. 3, whilst the alarms predicted to be generated in a time zone (15 minutes later to 120 minutes later) far away from the current time are displayed in the area 71B in FIG. 4. In the similar manner, the generation time zone of the alarms to be displayed in the area 71A can be selected sequentially by operating the button 76a.

In the example shown in FIG. 3, the kinds of data can be distinguished since the generation prediction times of the alarms (times until the predicted generation of the alarms), the tag names and the statuses are selectively put in parentheses "( )". That is, in the example shown in FIG. 3, each of the actual measurement alarms and each of the prediction alarms concerning data acquired as the actual measurement values is not put in the parenthesis, but each of the estimation alarms and each of the prediction alarms concerning data acquired as the estimation values is put in the parenthesis. Thus, the data as the subject of the alarm can be discriminated whether it is data actually measured in the plant 1 or data only treated in the process simulator 3.

Figure 5:
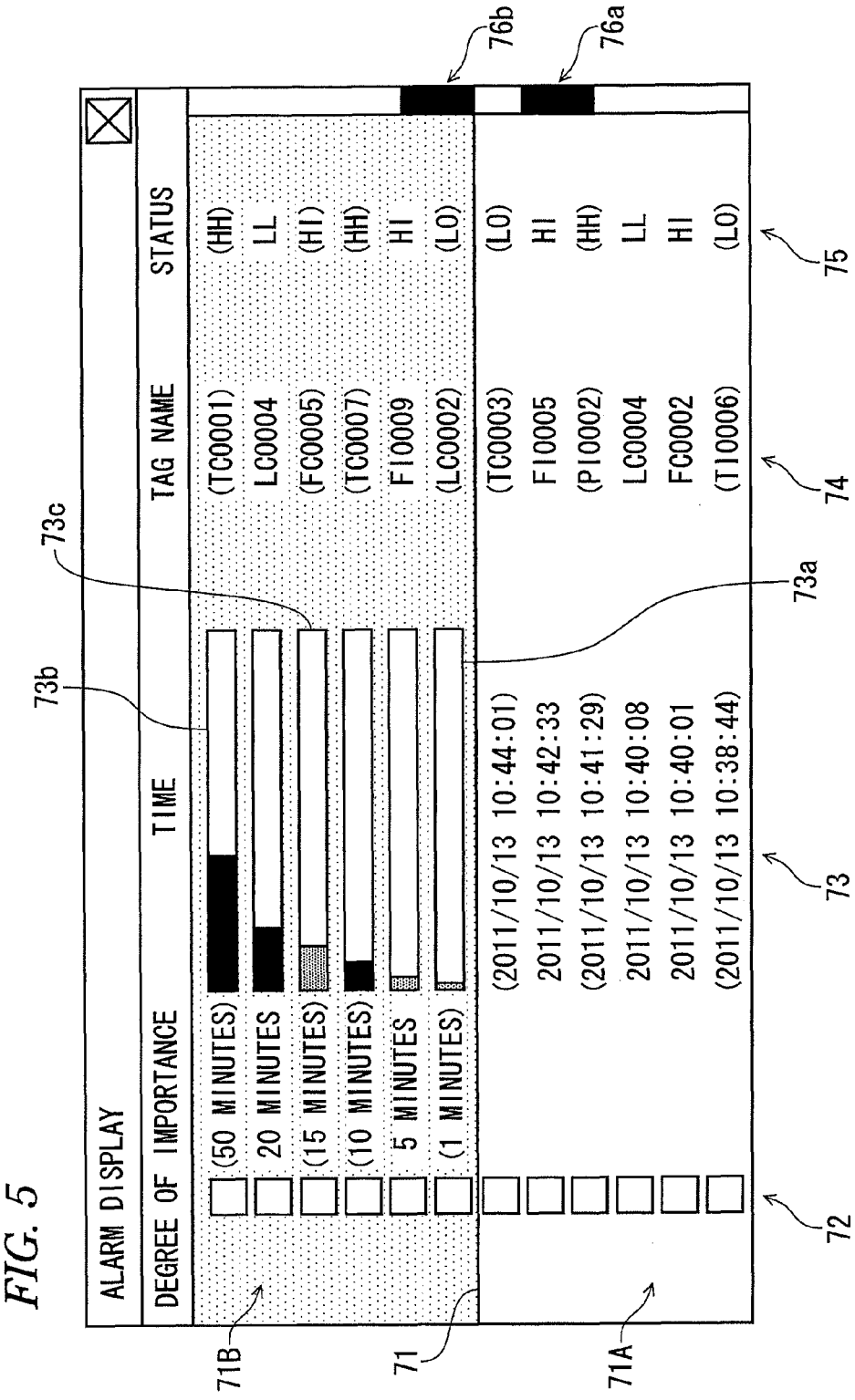
FIG. 5 is a diagram showing an example where degrees of importance of alarms is represented by different colors of a bar.

FIG. 5 is a diagram showing an example where the degrees of importance of the alarms is represented by the different colors of the bar.

That is, in FIG. 5, the color of the bar 73b differs from the color of the bar 73c, whereby it is represented that the degree of importance of the alarm shown by the bar 73b is longer than that of the alarm shown by the bar 73c, for example.

Figure 6:
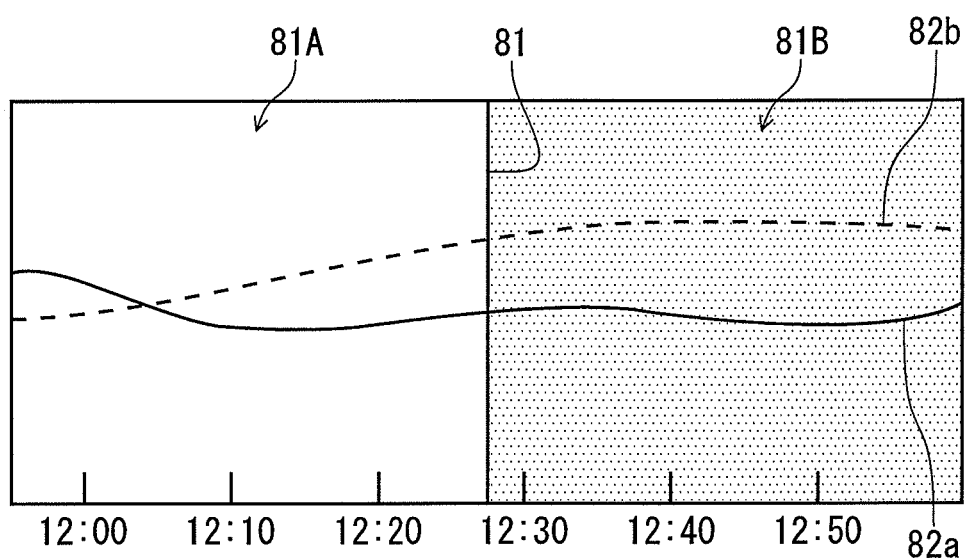
FIG. 6 is a diagram showing a part of a trend display screen of process data.

FIG. 6 is a diagram showing a part of the trend display screen of process data utilizing the process simulator 3 and the prediction simulator 4. Such the trend display screen is displayed in a juxtaposed manner with the alarm screen shown in FIG. 3 or 4, or displayed as another screen from the alarm screen.

As shown in FIG. 6, the abscissa of the trend display screen corresponds to the time and the ordinate thereof corresponds to the values of process data. A bar 81 representing the current time is displayed at the almost center position of the trend display screen. The past trend is displayed in an area 81A on the left side of the bar 81 and the future trend is displayed in an area 81B on the right side of the bar 81. The display data in the area 81A is based on the accrual measurement values or the estimation values and the display data in the area 81B is based on the prediction values. In the example of FIG. 6, although a graph 82a and a graph 82b representing the trend of the two process data, the number of the process data to be displayed is arbitrary.

In the trend display screen shown in FIG. 6, the background color of the area 81A representing the past trend is set to be same as the background color of the area 71A of the alarm screen shown in FIG. 3. Further, the background color of the area 81B representing the future trend is set to be same as the background color of the area 71B of the alarm screen. Thus, the corresponding relation between the display of the alarm screen and the display of the trend display screen can be easily grasped.

As described above, according to the alarm display apparatus of this embodiment, since the quick handling can be performed based on the estimation alarm relating to the state of the product and the state of the intermediate substance etc. relating to the quality of the product, the quality of the product can be improved. Further, since the handling can be performed based on the prediction alarm, the number of the alarms to be generated hereinafter can be reduced and the plant can be operated more safely.

Further, since the actual measurement alarms, the estimation alarms and the prediction alarms are displayed on the same alarm display screen, an operator can grasp the states of the alarms collectively. Furthermore, since the background color of the alarm display screen is differentiated between the past alarms and the current/future alarms, an operator can correctly discriminate the kinds of the alarms.

Further, in the display of the prediction alarms, since the prediction time until the generation of the alarm is represented by the length of the bar, an operator can recognizes by intuition the time until the generation of the alarm.

Further, since the display mode of the alarm is changed between the data from which the actual measurement values are obtained and the data from which only the estimation values are obtained, an operator can correctly recognize the information source of the alarms.

Since the bar representing the current time is displayed almost at the center position of the alarm display screen, the position distinguishing the past alarms and the future alarms can be clarified. Thus, an operator can quickly recognize the meanings of the alarms and so the handling can be performed easily.

Second Embodiment

The alarm display apparatus according to another embodiment (second embodiment) will be explained with reference to FIGS. 7 to 12. The alarm display apparatus according to this embodiment performs the trend display as well as the alarm display.

Figure 7:
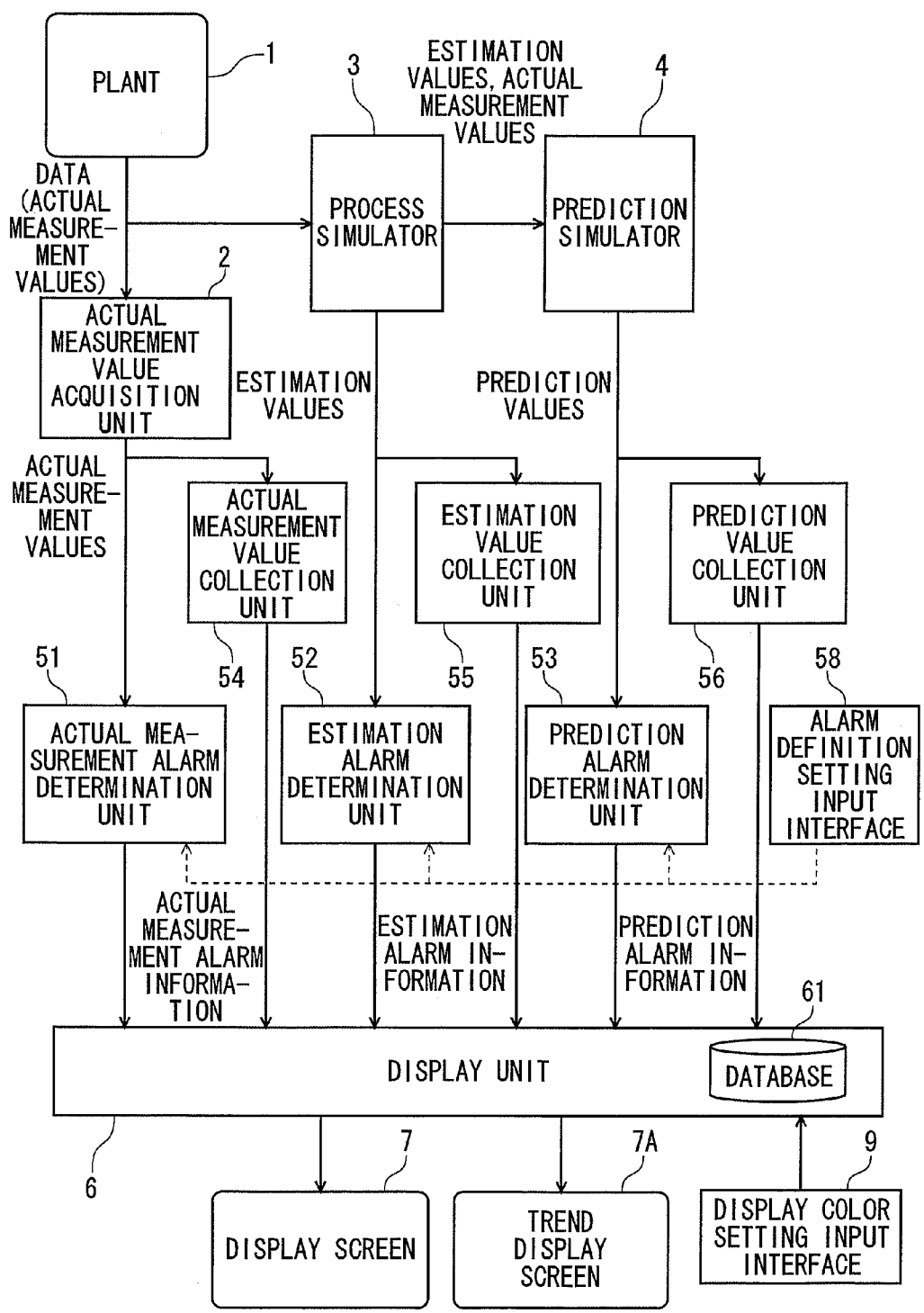
FIG. 7 is a diagram showing a configuration of an alarm display apparatus according to another embodiment.

FIG. 7 is a diagram showing the configuration of the alarm display apparatus according to this embodiment. In FIG. 7, portions identical to those of FIG. 1 are referred to by the common symbols, with explanation thereof being omitted.

As shown in FIG. 7, the alarm display apparatus of this embodiment includes an actual measurement value collection unit 54 for collecting the actual measurement values outputted from the actual measurement value acquisition unit 2, an estimation value collection unit 55 for collecting the estimation values outputted from the process simulator 3, and a prediction value collection unit 56 for collecting the prediction values outputted from the prediction simulator 4.

The actual measurement values collected by the actual measurement value collection unit 54, the estimation values collected by the estimation value collection unit 55 and the prediction values collected by the prediction value collection unit 56 are applied to the display unit 6 and stored in the database 61.

According to the alarm display apparatus of this embodiment, the display unit 6 displays the alarm information on the alarm display screen 7 and further the trend graphs etc. on a trend display screen 7A, by using the date stored in the database 61. Although in FIG. 7, the alarm display screen 7 for displaying the alarm information and the trend display screen 7A for displaying the trend graphs etc. are separately shown, the display mode of these screens is arbitrary. For example, either one of these screens may be selectively displayed in a switching manner or both the screens may be juxtaposed on the same screen.

The alarm display apparatus of this embodiment further includes a display color setting input interface 9 for receiving the settings of the display colors of the alarm display screen 7 and the trend display screen 7A, and an alarm definition setting input interface 58 for setting threshold values etc. used for the determinations in the actual measurement alarm determination unit 51, the estimation alarm determination unit 52 and the prediction alarm determination unit 53.

Next, the operations of the alarm display apparatus of this embodiment will be explained.

Figure 8:
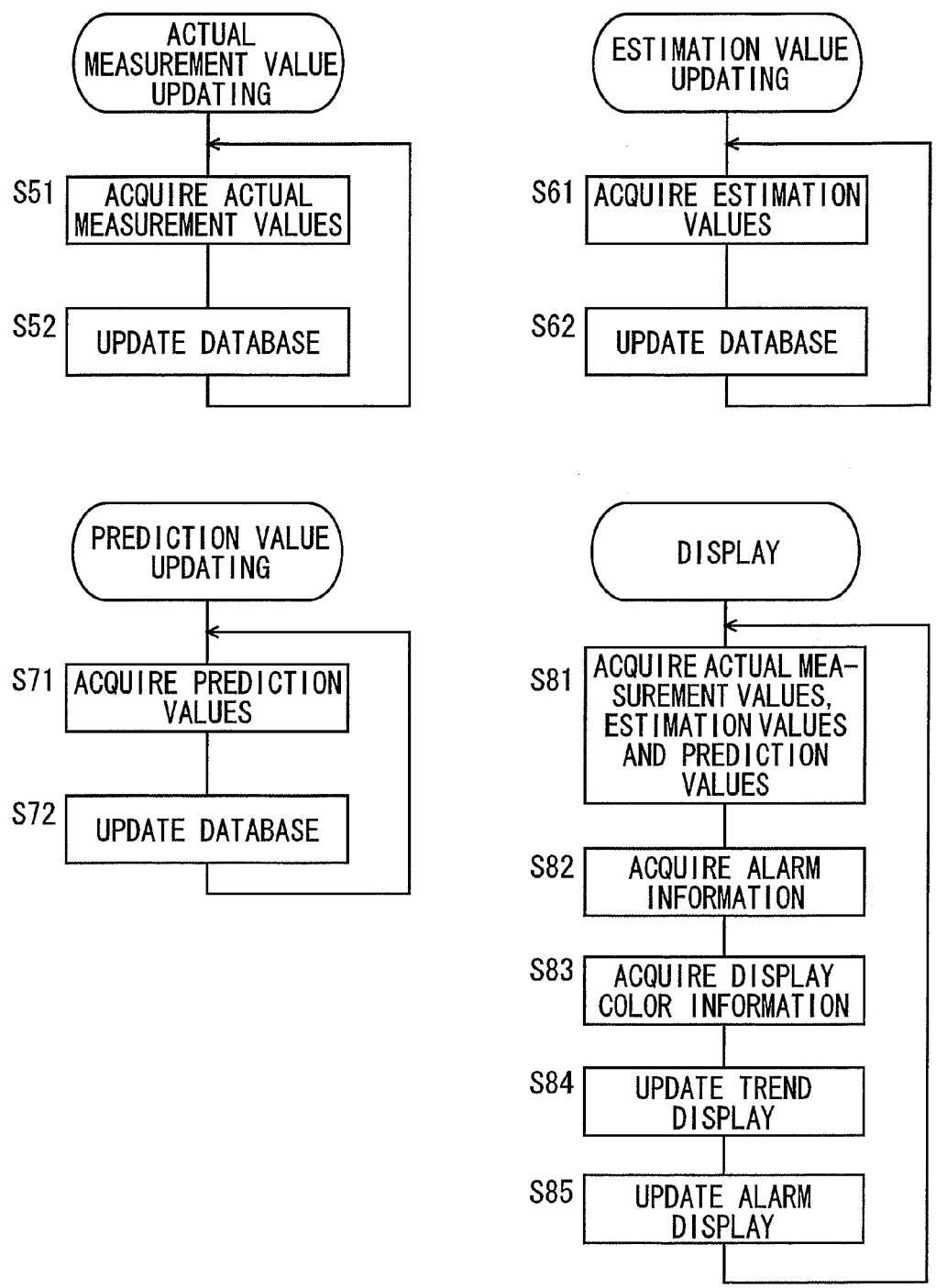
FIG. 8 is a flowchart showing an operation relating to a trend display.

FIG. 8 is a flowchart showing an operation relating to the display (trend display) of the trend display screen 7A among the operations of the alarm display apparatus of this embodiment. In the alarm display apparatus of this embodiment, the operation of the actual measurement alarm determination unit 51 (step S1 to step S4 in FIG. 2), the operation of the estimation alarm determination unit 52 (step S11 to step S14 in FIG. 2), and the operation of the prediction alarm determination unit 53 (step S21 to step S24 in FIG. 2) are same as those of the first embodiment.

Step S51 to step S52 of FIG. 8 represent the operation of the actual measurement value collection unit 54.

In step S51 of FIG. 8, the actual measurement value collection unit 54 collects the actual measurement values from the actual measurement value acquisition unit 2. Then, in step S52, the actual measurement value collection unit 54 applies the actual measurement values collected from the actual measurement value acquisition unit 2 to the display unit 6 and the process returns to step S51. The actual measurement values of the database 61 are updated by the processing of step S52.

Step S61 to step S62 of FIG. 8 represent the operation of the estimation value collection unit 55.

In step S61 of FIG. 8, the estimation value collection unit 55 collects the estimation values from the process simulator 3. Then, in step S62, the estimation value collection unit 55 applies the estimation values collected from the process simulator 3 to the display unit 6 and the process returns to step S61. The estimation values of the database 61 are updated by the processing of step S62.

Step S71 to step S72 of FIG. 8 represent the operation of the prediction value collection unit 56.

In step S71 of FIG. 8, the prediction value collection unit 56 collects the prediction values from the prediction simulator 4. Then, in step S72, the prediction value collection unit 56 applies the prediction values collected from the prediction simulator 4 to the display unit 6 and the process returns to step S71. The prediction values of the database 61 are updated by the processing of step S72.

Step S81 to step S85 of FIG. 8 represent the operation of the display unit 6.

In step S81 of FIG. 8, the display unit 6 accesses the database 61 and reads the newest data of the actual measurement values, the estimation values and the prediction values.

Then in step S82, the display unit 6 accesses the database 61 and reads newest data of the actual measurement alarm information, the estimation alarm information and the prediction alarm information.

Then in step S83, the display unit 6 accesses the database 61 and reads newest display color information. The display color information will be explained later.

Then in step S84, the display (trend display) of the display screen 7A is updated based on the alarm information read in step S82 and the display color information read in step S83.

Then in step S85, the display (alarm display) of the display screen 7 is updated based on the actual measurement values, the estimation values and the prediction values read in step S81 and the display color information read in step S83, and the processing returns to step S81

Figure 9:
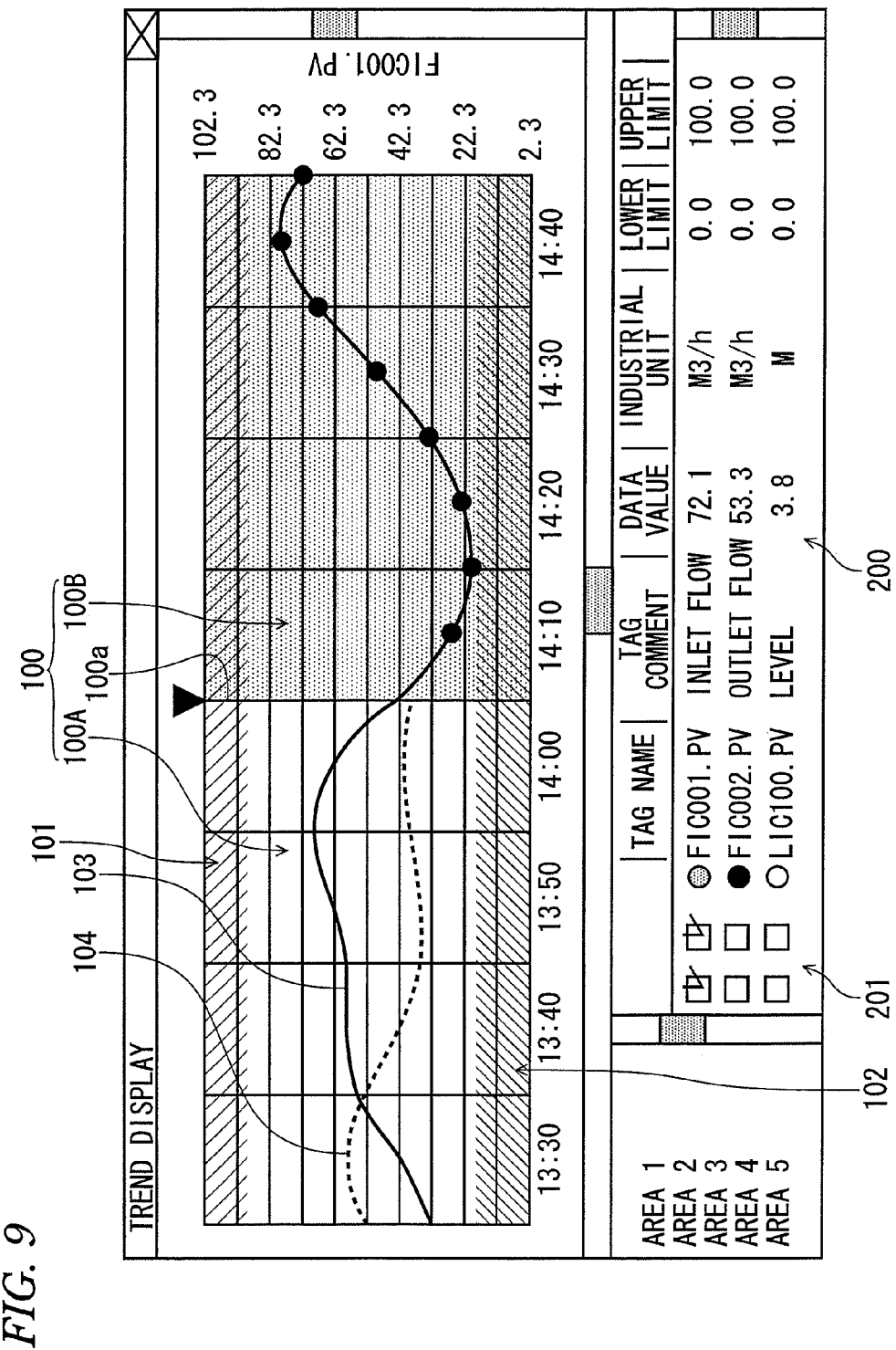
FIG. 9 is a diagram showing an example of a trend display screen.

FIG. 9 is a diagram showing an example of the display (trend display) of the display screen 7A.

As shown in FIG. 9, the trend of each of the actual measurement values, the estimation values and the prediction values is displayed by a trend graph on the trend display, which abscissa represents the time axis and ordinate represents the data values. In the example of FIG. 9, the trend graphs are displayed in an area 100. The area 100 is divided into an area 100A representing the past trends on the left side of a vertical line 100a showing the current time and an area 100B representing future trends on the right side thereof.

In each of the area 100A and the area 100B, each of an alarm generation area 101 and an alarm generation area 102 is disposed in a belt shape. The alarm generation area 101 represents an area where the actual measurement value, the estimation value or the prediction value becomes bigger than an upper limit value, and the alarm generation area 102 represents an area where the actual measurement value, the estimation value or the prediction value becomes lower than a lower limit value. Each of the upper limit value and the lower limit value is set as a threshold value via the alarm definition setting input interface 58.

The area 100A, the area 100B, the alarm generation area 101 and the alarm generation area 102 can be visually discriminated by differentiating the background colors etc. therebetween. Thus, a user can recognizes by intuition each of the area 100A, the area 100B, the alarm generation area 101 and the alarm generation area 102. The display/non-display of each of the alarm generation area 101 and the alarm generation area 102 may be performed in a switching manner.

In the example of FIG. 9, the trend of the actual measurement values and the trend of the estimation values are represented by a steady line 103 and a dotted line 104, respectively. An area 200, displaying the kinds of data to be displayed as the trends and the data values thereof etc., are provided beneath the area 100. The kinds of data and the kinds of the actual measurement values, the estimation values or the prediction values to be displayed as the trends in the area 100 can be selected by checking boxes 201 in the area 200.

When a cursor is moved to the trend (steady line 103, dotted line 104 etc.) displayed in the area 100, the kind (data kind) of this trend may be displayed by using an icon representing a meter etc. In this case, a user can easily grasp the kind of the trend.

FIG. 10 is a diagram showing an example of the display (alarm display) of the display screen 7.

As shown in FIG. 10, the display screen displays the alarms in a chronological order along the vertical direction as a time axis. In the example of FIG. 10, an area 302 for displaying the alarms having been generated in the past, that is, the actual measurement alarms and the estimation alarms, is provided below a bar 301 representing the current time. Further, an area 303 for displaying the alarms predicted to be generated in the future, that is, the prediction alarms, is provided above the bar 301.

The alarms displayed in the area 302 are disposed in a chronological order and also the alarms displayed in the area 303 are disposed in chronological order. In each of these areas, the alarms are disposed in the reverse chronological order from the lower position toward the upper position in a manner that the alarm having the older generation time or the older prediction time is disposed at the lower position.

The attribute and the generation time etc. of each of the alarms are shown in a field 304 for displaying the degree of importance of the each alarm, a field 305 for displaying the generation time or the generation prediction time of the each alarm, a field 306 for displaying a tag name as the generation source of the each alarm and a field 307 for displaying the status of the each alarm.

Further, FIG. 10 shows, as an example, a case that a part of the actual measurement alarms and the estimation alarms stored in the database 61 are displayed in the area 302, and a part of the prediction alarms stored in the database 61 are displayed in the area 303. The actual measurement alarms and the estimation alarms to be displayed in the area 302 can be selected by operating a button 308a, and the prediction alarms to be displayed in the area 303 can be selected by operating a button 308b. The position of the button 308a along the vertical direction corresponds to a time zone of the generation times of the alarms to be displayed, and the position of the button 308b along the vertical direction corresponds to a time zone of the generation prediction times of the alarms to be displayed. When each of the button 76a and the button 76b is moved in the vertical direction, the alarms to be displayed are scrolled in corresponding to the button thus moved.

In the example shown in FIG. 10, the kinds of data can be distinguished since the generation prediction times of the alarms (times until the predicted generation of the alarms), the tag names and the statuses are selectively put in parentheses "( )". That is, in the example shown in FIG. 10, each of the actual measurement alarms and each of the prediction alarms concerning data acquired as the actual measurement values is not put in the parenthesis, but each of the estimation alarms and each of the prediction alarms concerning data acquired as the estimation values is put in the parenthesis. Thus, the data as the subject of the alarm can be discriminated whether it is data actually measured in the plant 1 or data only treated in the process simulator 3.

Next, the explanation will be made as to the display color of the display (trend display) of the trend display screen 7A and the display (alarm display) of the trend display screen 7.

The display colors of the trend display and the alarm display are set via the display color setting input interface 9 and stored in the database 61 as the display color information. To be concrete, the background color of the area 100A, the background color of the area 100B, the background color of the alarm generation area 101, the background color of the alarm generation area 102 and the colors of the trend pens (steady line 103, dotted line 104 etc.) of the trend display are set by RGB values.

In this embodiment, since the background colors of the trend display are made common to those of the alarm display, the relation between these displays is made clear. For example, when the background color of the area 100A of the trend display is made common to the background color of the area 302 of the alarm display or the background color of the area 100B of the trend display is made common to the background color of the area 303 of the alarm display, the background colors respectively representing the past and the future are made same between the trend display and the alarm display. Thus, a user can recognizes by intuition the area relating to the past and the area relating to the future.

In view of the work of inputting all the display colors and the suitable arrangement of the display colors, the combination of the background colors and the colors of the trend pens etc. and the combination of the background colors etc. may be registered in the database 61 etc. in advance, whereby a part of the display colors may be set automatically. For example, when a user selects the background color in the trend display and the alarm display (background color of the area 100A and the area 302 or the background color of the area 100B and the area 303) from the colors prepared by default, the colors to be combined with the selected background color can be automatically allocated as the colors of the trend pens, the background color of the alarm generation area 101 and the background color of the alarm generation area 102. In this case, when the colors of the trend pens capable of being easily recognized with respect to the background colors, respectively, are registered in advance, the suitable color of the trend pen can be automatically set. The combination of these colors may be set in view of the contrast of the two colors or in view of the complimentary colors. For example, the background color of the area concerning the past and the background color of the area concerning the further may be set so as to be the complimentary colors. In this manner, when the combination of the display colors is registered in advance, the work of a user at the time of setting the display colors can be reduced.

The display colors of the trend display and the alarm display may be set with reference to the display colors used in another apparatus or a system different from the alarm display apparatus, for example, the field control system. For example, in the case where the field control system performs the trend display and the alarm display, if the background colors and the colors of the trend pens same as those used in the field control system are selected, the background colors and the colors of the trend pens can be made common between the alarm display apparatus and the field control system. As a result, the visibility of the trend display and the alarm display can be improved for a user who has an opportunity of utilizing another apparatus.

Figure 11:
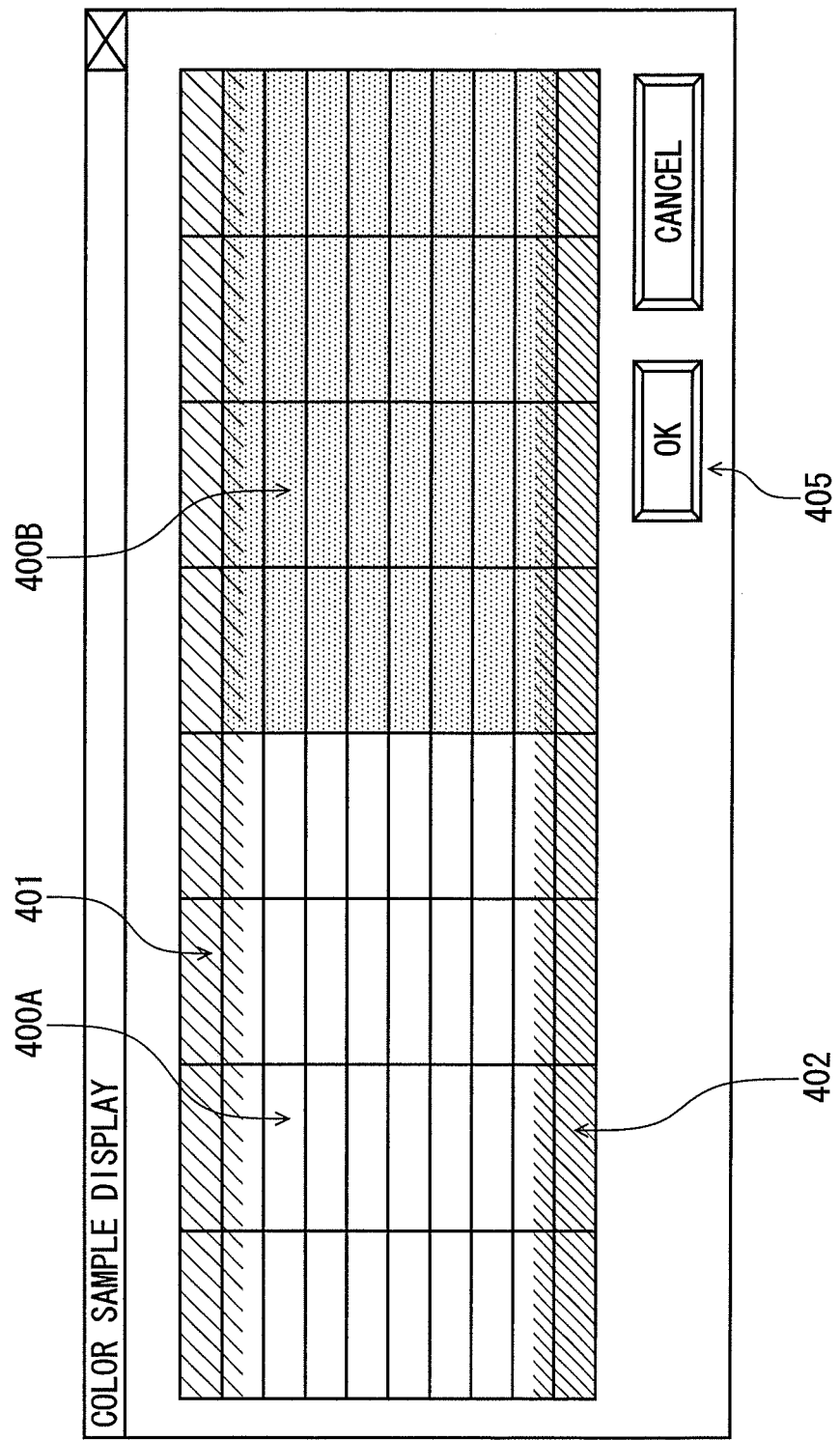
FIG. 11 shows an example of a color sample display screen.

FIG. 11 shows an example of a color sample display screen which is displayed at the time of setting the display colors via the display color setting input interface 9. In this screen, since the background colors of the respective areas of the trend display screen are displayed in accordance with the instructions of a user, the user can confirm in advance the actual display colors of the trend display on the color sample display screen. The background color displayed on the color sample display screen is set as the background color of the trend display screen by operating a button 405 in the color sample display screen. In the example of FIG. 11, the area 400A corresponds to the area 100A (FIG. 9), the area 400B corresponds to the area 100B (FIG. 9), the area 401 corresponds to the area 201 (FIG. 9) and the area 402 corresponds to the area 202 (FIG. 9). Although FIG. 11 shows the case where only the background colors are displayed, the trend pens may be displayed simultaneously so that the colors of the trend pens can also be confirmed. In this manner, since a user can quickly confirm the display colors by using the color sample display screen, the work of a user at the time of setting the display colors can be reduced.

Figure 12:
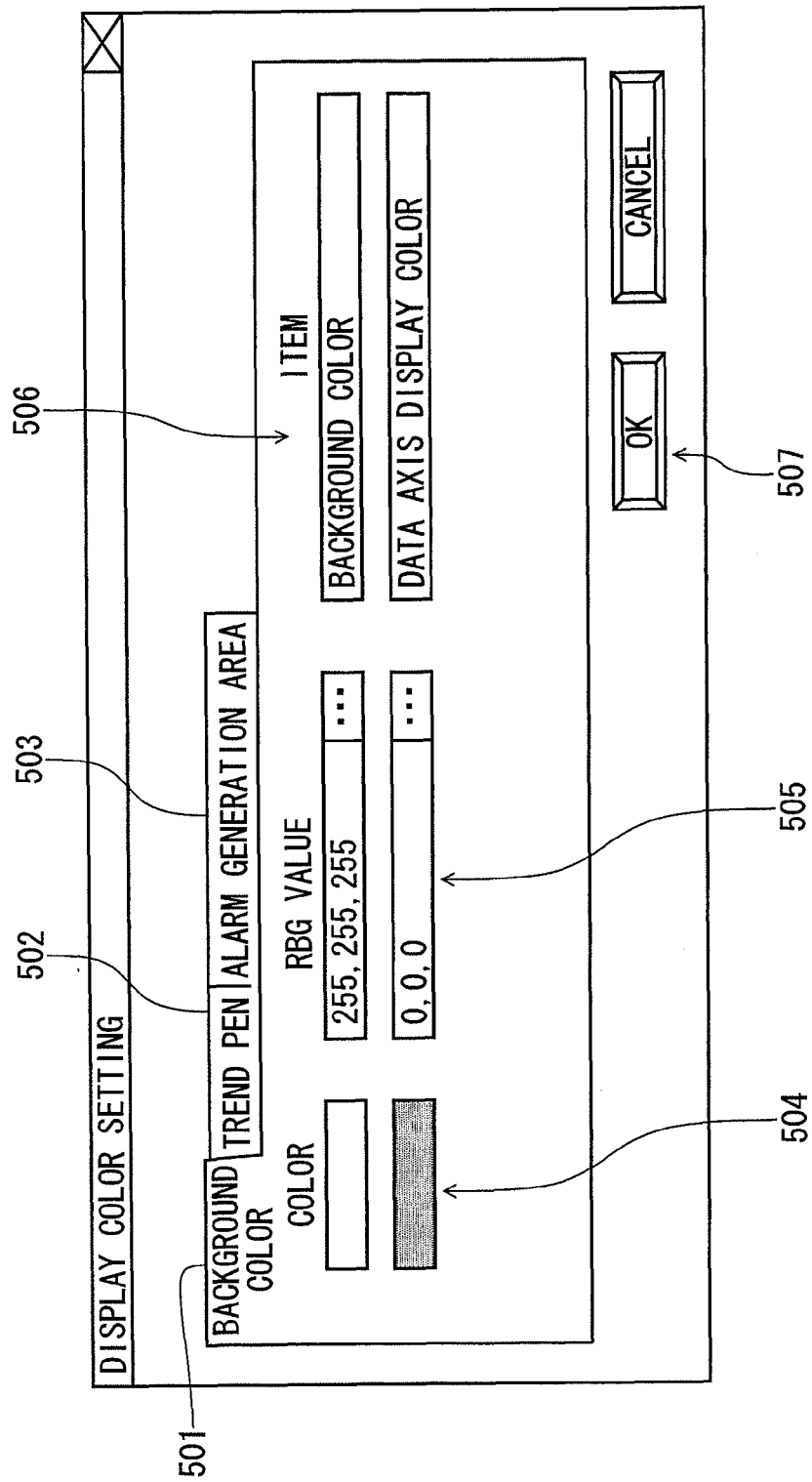
FIG. 12 is a diagram showing an example of a display color setting screen.

FIG. 12 is a diagram showing an example of a display color setting screen displayed by the display color setting input interface 9 in the case of manually setting the display colors.

In the example of FIG. 12, "background color", "trend pen" and "alarm generation area" can be selected by a label 501, a label 502 and a label 503, respectively, and the display colors thereof can be set. In FIG. 12, a screen for setting the "background color" is displayed. In this screen, the actual display colors, the RBG values thereof and the elements to which the display colors are applied are displayed in an area 504, an area 505 and an area 506, respectively. In this state, when a button 507 is operated, the display color of the corresponding element can be set. In this manner, all of the display colors of the trend display and the alarm display may be set manually.

Although the second embodiment is explained as to the case where the areas are discriminated by the background colors, respectively, the areas may be discriminated by adding a design such as a slanted line. The respective areas may be displayed by the combination of the display colors and the design.

As explained above, according to the alarm display apparatus and the alarm display method of this invention, since the actual measurement alarm information, the estimation alarm information and the prediction alarm information are displayed on the same screen, the alarm information necessary for the operation of the plant can be suitably displayed.

The applied range of this invention is not limited to the aforesaid embodiments. This invention can be widely applied to the alarm display apparatus etc. which displays the alarm information indicating the generation state of the alarms based on the information from the plant.

What is claimed is:

1. An alarm display apparatus for displaying alarm information indicating a generation state of alarms based on information acquired from a plant, comprising:

an acquisition module configured to acquire actual measurement values of data obtained from the plant;

a plant simulation module configured to simulate a current state of the plant based on the data obtained from the plant to thereby output current estimation values of data of the plant;

a prediction module configured to predict a future state of the plant based on the estimation values outputted from the plant simulation module to thereby output prediction values of data of the plant;

an actual measurement alarm determination module configured to compare the actual measurement values acquired by the acquisition module with a threshold value to thereby output actual measurement alarm information based on a result of the comparison between the actual measurement values and the threshold value;

an estimation alarm determination module configured to compare the estimation values outputted from the plant simulation module with a threshold value to thereby output estimation alarm information based on a result of the comparison between the estimation values and the threshold value;

a prediction alarm determination module configured to compare the prediction values outputted from the prediction module with a threshold value to thereby output prediction alarm information based on a result of the comparison between the prediction values and the threshold value; and a display module configured to display, on the same screen, the actual measurement alarm information outputted from the actual measurement alarm determination module, the estimation alarm information outputted from the estimation alarm determination module and the prediction alarm information outputted from the prediction alarm determination module, wherein when the actual measurement alarm information is output from the actual measurement alarm determination module or the estimation alarm information is output from the estimation alarm determination module, the display module displays the output actual measurement alarm information or the estimation alarm information, instead of the prediction alarm information displayed with respect to alarm corresponding to the actual measurement alarm information or the estimation alarm information.

2. The alarm display apparatus according to claim 1, wherein the display module displays the actual measurement alarm information, the estimation alarm information and the prediction alarm information in a manner that they are juxtaposed on the screen in a chorological order accorded to generation times of the respective alarms.

3. The alarm display apparatus according to claim 2, wherein the display module displays the actual measurement alarm information, the estimation alarm information and the prediction alarm information in a manner that background colors of each of the respective information differ between the alarms generated in past and the alarms to be generated in future.

4. The alarm display apparatus according to claim 2, wherein the display module displays the actual measurement alarm information, the estimation alarm information or the prediction alarm information in a scrollable manner that a time zone of generation times of the alarms is selectable.

5. The alarm display apparatus according to claim 1, wherein the display module displays each of the alarms represented by the prediction alarm information in a manner that a time period, from a current time to a time where the alarm is predicted to be generated, is displayed as a graphical display.

6. The alarm display apparatus according to claim 5, wherein the display module displays the graphical display with a color according to a degree of importance of the alarm.

7. The alarm display apparatus according to claim 1, wherein the display module displays the prediction alarm information in a mode capable of discriminating whether or not the prediction alarm information relates to data kind to be subjected as the actual measurement alarm information.

8. The alarm display apparatus according to claim 1, wherein the display module displays, as trends, the actual measurement values acquired by the acquisition module, the estimation values outputted from the plant simulation module or the prediction values outputted from the prediction module.

9. The alarm display apparatus according to claim 3, wherein the display module displays, as trends, the actual measurement values acquired by the acquisition module, the estimation values outputted from the plant simulation module or the prediction values outputted from the prediction module in a mode that background colors of the respective trends differ between the trends in past and the trends in future, and wherein
the background color at a time of displaying the actual measurement alarm information, the estimation alarm information and the prediction alarm information in the past is same as the background color at a time of displaying the trends in the past, and the background color at a time of displaying the actual measurement alarm information, the estimation alarm information and the prediction alarm information in the future is same as the background color at a time of displaying the trends in the future.

10. The alarm display apparatus according to claim 8, wherein the display module displays, at a time of displaying the trends, an area representing a determination result of the actual measurement alarm determination module, the estimation alarm determination module or the prediction alarm determination module.

11. The alarm display apparatus according to claim 8, wherein a combination of display colors of a plurality of elements in the trend display is registered in advance, and the display module displays the trends in accordance with the combination thus registered.

12. The alarm display apparatus according to claim 8, further comprising:
a receiving module configured to receive setting of display colors used for the trend display,
wherein the display module displays a color sample screen for showing the display colors received by the receiving module prior to the trend display.

13. The alarm display apparatus according to claim 8, wherein when a cursor is moved to the trend of the trend display, the display module displays a kind of the trend to which the cursor is moved.

14. The alarm display apparatus according to claim 8, wherein the display colors in the trend display are set with reference to display colors used in another apparatus different from the alarm display apparatus.

15. An alarm display method for displaying alarm information indicating a generation state of alarms based on information acquired from a plant, comprising:
acquiring actual measurement values of data obtained from the plant;
simulating a current state of the plant based on the data obtained from the plant to thereby output current estimation values of data of the plant;
predicting a future state of the plant based on the estimation values to thereby output prediction values of data of the plant;
comparing the actual measurement values with a threshold value to thereby output actual measurement alarm information based on a result of the comparison between the actual measurement values and the threshold value;
comparing the estimation values with a threshold value to thereby output estimation alarm information based on a result of the comparison between the estimation values and the threshold value;
comparing the prediction values with a threshold value to thereby output prediction alarm information based on a result of the comparison between the prediction values and the threshold value; and
displaying, on a same screen, the actual measurement alarm information, the estimation alarm information and the prediction alarm information,
wherein when the actual measurement alarm information or the estimation alarm information is output, the output actual measurement alarm information or the estimation alarm information is displayed instead of the prediction alarm information displayed with respect to alarm corresponding to the actual measurement alarm information or the estimation alarm information.

* * * * *